(12) United States Patent
Lu et al.

(10) Patent No.: US 8,305,779 B2
(45) Date of Patent: Nov. 6, 2012

(54) PARALLEL-CONNECTED UNINTERRUPTED POWER SUPPLY CIRCUIT

(75) Inventors: Yansong Lu, Shanghai (CN); Jingtao Tan, Shanghai (CN); Xiao Chen, Shanghai (CN); Hao Yu, Shanghai (CN); Jianping Ying, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 568 days.

(21) Appl. No.: 12/551,042

(22) Filed: Aug. 31, 2009

(65) Prior Publication Data

US 2010/0054002 A1   Mar. 4, 2010

(30) Foreign Application Priority Data

Sep. 1, 2008   (TW) ................................ 97133516 A

(51) Int. Cl.
*H02M 5/45* (2006.01)
(52) U.S. Cl. ........................................................ 363/37
(58) Field of Classification Search .................... 363/17, 363/24, 37, 70, 71, 123, 126; 323/207; 307/46, 307/64, 66, 82; 361/62
See application file for complete search history.

(56) References Cited

U.S. PATENT DOCUMENTS

| 4,635,177 A * | 1/1987 | Shekhawat et al. ............. 363/41 |
| 7,075,193 B2 * | 7/2006 | Yang et al. ....................... 307/66 |
| 7,450,408 B2 * | 11/2008 | Tan et al. ....................... 363/132 |
| 7,579,714 B2 * | 8/2009 | Okui ............................... 307/64 |

* cited by examiner

*Primary Examiner* — Adolf Berhane
*Assistant Examiner* — Yemane Mehari
(74) *Attorney, Agent, or Firm* — Volpe and Koenig, P.C.

(57) ABSTRACT

The configurations of a parallel-connected UPS circuit are provided in the present invention. The proposed circuit includes a neutral, a battery having a positive and a negative terminals, and a plurality of PFC boost converters, each of which includes a PFC circuit including an inductor having a first terminal coupled to the positive terminal and a second terminal, a rectifying bridge coupled to the second terminal of the inductor, and having a first terminal and a second terminal coupled to the negative terminal, a switch bridge having a first terminal coupled to the first terminal of the rectifying bridge and a second terminal coupled to the second terminal of the rectifying bridge, and a control switch having a first terminal and a second terminal coupled to the neutral.

22 Claims, 9 Drawing Sheets

PARALLEL-CONNECTED UNINTERRUPTED POWER SUPPLY CIRCUIT

FIELD OF THE INVENTION

The present invention relates to a parallel-connected uninterrupted power supply (UPS) circuit. More particularly, it relates to a circuit having a plurality of UPSs parallel-connected to each other such that the plurality of UPSs could reach a current balance.

BACKGROUND OF THE INVENTION

The UPS is applied in the power supply of the critical equipment. In FIG. 1, it shows a circuit diagram of a conventional online UPS. In which, it includes a power factor correction (PFC) boost converter (including silicon-controlled rectifiers (SCRs) SCR1-SCR2, inductors L1-L2, switches S1-S2, diodes D1-D2 and capacitors C1-C2), an inverter (including switches Si1-Si2, inductor Li and output capacitor Co), a controller (not shown) and a battery set (including a battery having a positive terminal and a negative terminal, SCRs SCR3-SCR4 and a fuse F2), and it further includes an input electrical magnetic interference (EMI) filter having a bypass AC input terminal, a normal AC input terminal and a neutral input terminal, fuses F1 and F3, inductor Lf, SCRs SCR5-SCR8 and an output EMI filter. In one of an AC mode and a DC mode, the PFC boost converter respectively converts one of an AC and a DC to a positive DC bus and a negative DC bus to provide a stable voltage to the inverter of the next stage.

As shown in FIG. 1, a rectifying circuit of the PFC boost converter is usually connected to the front-end of the battery and includes two rectifying switches. Please refer to the two SCRs SCR1-SCR2 of FIG. 1. After an input AC voltage is rectified by the rectifying circuit, it is required to go through a PFC circuit to be converted to a stable voltage for outputting, and then an AC voltage is outputted by the inverter. Due to the considerations of efficiency and voltage endurance, the choice for a conventional PFC circuit is usually a three-level PFC circuit, which includes an upper boost circuit providing a voltage to the positive DC bus capacitor C1 and a lower boost circuit providing a voltage to the negative DC bus capacitor C2.

For example, the three-level PFC circuit is jointly used by the AC mode when the conventional online UPS as shown in FIG. 1 is operating under the DC mode, and please refer to FIGS. 2(a)-2(b) for the specific working processes. FIG. 2(a) shows current flow directions of the positive half-cycle of the DC mode when the conventional online UPS is working under the DC mode. The smaller dashed path in the central portion of FIG. 2(a) shows a current charging the inductors L1 and L2. The larger dashed path in the surrounding portion of FIG. 2(a) shows a continued current of inductor charging the capacitor C1. FIG. 2(b) shows current flow directions when the conventional online UPS is working under the negative half-cycle of the DC mode. The smaller dashed path in the central portion of FIG. 2(b) shows a current charging the inductors L1 and L2. The larger dashed path in the surrounding portion of FIG. 2(b) shows a continued current of inductor charging the capacitor C2. As shown in FIG. 2(c), the lower switch S2 is continuously turned on and the upper switch S1 is engaged in the pulse-width modulation (PWM) chopping when a voltage is provided to the capacitor C1 connected to the positive terminal of DC bus in the positive half-cycle, and the upper switch S1 is continuously turned on and the lower switch S2 is engaged in the PWM chopping when a voltage is provided to the capacitor C2 connected to the negative terminal of DC bus in the negative half-cycle. As shown in FIG. 2(d), the input terminals of the UPS include an I/L and a neutral I/N, and the neutral should go straightly through the whole UPS until reaching the load side and connect to one of the two terminals of the load (O/L and O/N) from the reliability point of view. Due to that the positive and the negative terminals of the battery are connected to the neutral through the inductors L1 and L2 when the above-mentioned conventional online UPS is in a battery mode, thus the voltage on the neutral generates a voltage jump while switching and results in a quite large EMI. For solving the EMI problem, please refer to the two bypass diodes (DP and DN) connected in series and in front of the two inductors (L1 and L2), and the middle point of the two bypass diodes (DP and DN) is coupled to the neutral I/N. In this way, when switches S1 and S2 are under high frequency switching, one of the two inductors is failed, the EMI problem is greatly improved. Thus, the inductors of the PFC circuit alternately work under working frequency such that the utilization rate of the inductors is only 50% when the conventional online UPS operates under the battery mode.

On the other hand, generally, the customer would expect all the power modules use the same battery set in the battery mode when there are a plurality of UPSs of this type work under parallel connection, which will bring many advantages such as wire saving, easy to maintain, having relatively improved total reliability of the system etc. But this kind of conventional configuration of the UPS can not realize multiple parallel-connected UPSs with a jointly used battery set, and a jointly used neutral would result in a current unbalance of the two UPS modes and cause an out of control status after the multiple UPSs, each of which is shown in FIG. 1, are parallel-connected. In the positive half-cycle of the DC mode as shown in FIG. 2(a), after the current flows through the inductor L1 to reach the neutral, the current requires to go through the parallel-connected circuit of the two inductors of L2s to flow back to the battery when the two inductors L2s of two different UPS modes are parallel-connected between the neutral and the negative terminal of the battery. Although currents flow through the two L1s of the two UPS modes can be controlled by the respective switch S1, but in the two inductors of L2s, how the current shall be shared by each inductor L2 is totally determined by the specific parameters of the two inductors L2s, and a current balance between the two inductors L2s can not be controlled by switches. Similarly, in FIG. 2(b), the current sharing of the two inductors L1s through the parallel-connected circuit configured by the neutral is also determined by the parameters of L1s. The parameters of inductors L1 and L2 are related to the manufacturing technologies and the materials, and are hard to achieve basically the same. Furthermore, the magnetic elements such as the inductors are manufactured by mine materials containing copper and iron, and the costs of which are increasingly higher following the development of the economy. In this way, the currents flow through the inductors of each UPS mode are hardly to be independently controlled, which causes the input power of each UPS to be different from each other, result in inductor current oscillations and the current unbalance of switches, and the single battery set parallel-connected to multiple UPSs can not be realized also.

Thus, finding a method to realize the multiple UPSs parallel-connected to a battery set and to reduce the costs, decrease the volume and to diminish the EMI at the same time is always a target desired to be accomplished by the industry.

Keeping the drawbacks of the prior arts in mind, and employing experiments and research full-heartily and persistently, the applicant finally conceived a parallel-connected uninterrupted power supply circuit.

SUMMARY OF THE INVENTION

It is therefore an object of the present invention to provide a parallel-connected UPS circuit, and this circuit realizes the multiple UPS modes parallel-connected to a battery set, causes all the UPS modes to reach a current balance and reduces the usage of magnetic elements while comparing to the conventional configuration thus to dramatically decrease the volume of the UPS power mode, greatly diminish the EMI, relatively decrease the manufacturing costs and the total costs of the parallel-connected UPS circuit at the same time due to that an inductor is decreased and a switch is increased in each of the UPS modes.

According to the first aspect of the present invention, a UPS circuit includes a neutral, a battery having a positive terminal receiving a first DC voltage and a negative terminal, a first PFC boost converter including a first PFC circuit outputting a second and a third DC voltages, and including a first inductor having a first terminal coupled to the positive terminal and a second terminal, a first rectifying bridge including a first and a second bypass diodes coupled to a first middle point coupled to the second terminal of the first inductor, and having a first terminal and a second terminal coupled to the negative terminal, a first switch bridge including a first upper and a first lower switches coupled to a second middle point, and having a first terminal coupled to the first terminal of the first rectifying bridge and a second terminal coupled to the second terminal of the first rectifying bridge, a first control switch having a first terminal coupled to the second middle point, a second terminal coupled to the neutral and a control terminal, and a first inverter receiving the second and the third DC voltages and outputting a first AC voltage, and a second PFC boost converter including a second PFC circuit outputting the second and the third DC voltages, and including a second inductor having a first terminal coupled to the positive terminal and a second terminal, a second rectifying bridge including a third and a fourth bypass diodes coupled to a third middle point coupled to the second terminal of the second inductor, and having a first terminal and a second terminal coupled to the negative terminal, a second switch bridge including a second upper and a second lower switches coupled to a fourth middle point, and having a first terminal coupled to the first terminal of the second rectifying bridge and a second terminal coupled to the second terminal of the second rectifying bridge, a second control switch having a first terminal coupled to the fourth middle point, a second terminal coupled to the neutral and a control terminal, and a second inverter receiving the second and the third DC voltages and outputting the first AC voltage.

Preferably, the circuit further includes a rectifying circuit, an output capacitor having a first and a second terminals and a DC bus having a positive and a negative terminals, wherein each of the first and the second control switches further includes a control terminal, the rectifying circuit receives a second AC voltage and outputs the first DC voltage, each of the first and the second inverters has a first input terminal coupled to the positive terminal of the DC bus, a second input terminal coupled to the negative terminal of the DC bus and an output terminal coupled to the first terminal of the output capacitor, and the neutral is coupled to the second terminal of the output capacitor.

Preferably, the first PFC circuit further includes a first upper diode, a first upper capacitor, a first lower diode and a first lower capacitor, the second PFC circuit further comprises a second upper diode, a second upper capacitor, a second lower diode and a second lower capacitor, each the diode has an anode and a cathode, and each the capacitor has a first and a second terminals.

Preferably, the anode of the first upper diode is coupled to the first terminal of the first switch bridge, the cathode of the first upper diode is coupled to the first terminal of the first upper capacitor and the first input terminal of the first inverter, the cathode of the first lower diode is coupled to the second terminal of the first switch bridge, the anode of the first lower diode is coupled to the second terminal of the first lower capacitor and the second input terminal of the first inverter, the second terminal of the first upper capacitor and the first terminal of the first lower capacitor are both coupled to the neutral, the anode of the second upper diode is coupled to the first terminal of the second switch bridge, the cathode of the second upper diode is coupled to the first terminal of the second upper capacitor and the first input terminal of the second inverter, the cathode of the second lower diode is coupled to the second terminal of the second switch bridge, the anode of the second lower diode is coupled to the second terminal of the second lower capacitor and the second input terminal of the second inverter, and the second terminal of the second upper capacitor and the first terminal of the second lower capacitor are both coupled to the neutral.

Preferably, the anode of the first upper diode is coupled to the second terminal of the first inductor, the first bypass diode is a first SCR, the anode of the first SCR is coupled to the anode of the first upper diode, the cathode of the first SCR is coupled to the drain of the first upper switch, the anode of the second upper diode is coupled to the second terminal of the second inductor, the third bypass diode is a second SCR, the anode of the second SCR is coupled to the anode of the second upper diode, and the cathode of the second SCR is coupled to the drain of the second upper switch Preferably, the first PFC circuit further includes a first upper diode, a first upper capacitor, a third control switch and a first lower capacitor, the second PFC circuit further comprises a second upper diode, a second upper capacitor, a fourth control switch and a second lower capacitor, each the diode has an anode and a cathode, each the capacitor has a first and a second terminals, and each of the third and the fourth control switches has a first, a second and a control terminals.

Preferably, the anode of the first upper diode is coupled to the first terminal of the first switch bridge, the cathode of the first upper diode is coupled to the first terminal of the first upper capacitor and the first input terminal of the first inverter, the second terminal of the third control switch is coupled to the second terminal of the first switch bridge, the first terminal of the third control switch is coupled to the second terminal of the first lower capacitor and the second input terminal of the first inverter, and the second terminal of the first upper capacitor and the first terminal of the first lower capacitor are both coupled to the neutral, the anode of the second upper diode is coupled to the first terminal of the second switch bridge, the cathode of the second upper diode is coupled to the first terminal of the second upper capacitor and the first input terminal of the second inverter, the second terminal of the fourth control switch is coupled to the second terminal of the second switch bridge, the first terminal of the fourth control switch is coupled to the second terminal of the second lower capacitor and the second input terminal of the second inverter, and the second terminal of the second upper capacitor and the first terminal of the second lower capacitor are both coupled to the neutral.

Preferably, the third control switch is an IGBT having a reverse parallel-connected diode, and the fourth control switch is an IGBT having a reverse parallel-connected diode.

Preferably, each of the first upper and the first lower switches has a first, a second and a control terminals, the first terminal of the first upper switch and the second terminal of the first lower switch are both coupled to the second middle point, the second terminal of the first upper switch is coupled to the first terminal of the first switch bridge, and the first terminal of the first lower switch is coupled to the second terminal of the first switch bridge.

Preferably, each of the second upper and the second lower switches has a first, a second and a control terminals, the first terminal of the second upper switch and the second terminal of the second lower switch are both coupled to the fourth middle point, the second terminal of the second upper switch is coupled to the first terminal of the second switch bridge, and the first terminal of the second lower switch is coupled to the second terminal of the second switch bridge.

Preferably, each the diode has an anode and a cathode, the anode of the first bypass diode is coupled to the cathode of the second bypass diode and the first middle point, the cathode of the first bypass diode is coupled to the first terminal of the first rectifying bridge, and the anode of the second bypass diode is coupled to the second terminal of the first rectifying bridge.

Preferably, each the diode has an anode and a cathode, the anode of the third bypass diode is coupled to the cathode of the fourth bypass diode and the third middle point, the cathode of the third bypass diode is coupled to the first terminal of the second rectifying bridge, and the anode of the fourth bypass diode is coupled to the second terminal of the second rectifying bridge.

Preferably, the circuit operates under one of a DC mode having a positive and a negative half-cycles and an AC mode having a positive and a negative half-cycles, wherein each of the first and the second control switches is an IGBT having a reverse parallel-connected diode, the first and the second control switches are turned on while under the positive half-cycle of the DC mode and the positive and the negative half-cycle of the AC mode; the first and the second control switches are turned off while under the negative half-cycle of the DC mode where the reverse parallel-connected diodes of the first and the second control switches are respectively used to prevent reverse flows of a first current of the first control switch and a second current of the second control switch and to bear a first reverse and a second reverse voltages such that the first and the second PFC circuits reach a current balance at this time moment.

According to the second aspect of the present invention, a UPS circuit includes a neutral, a battery having a positive terminal receiving a first DC voltage and a negative terminal, and a plurality of PFC boost converters, each of which includes a PFC circuit outputting a second and a third DC voltages includes an inductor having a first terminal coupled to the positive terminal and a second terminal, a rectifying bridge includes a first and a second bypass diodes coupled to a first middle point coupled to the second terminal of the inductor, and having a first terminal and a second terminal coupled to the negative terminal, a switch bridge includes a first upper and a first lower switches coupled to a second middle point, and having a first terminal coupled to the first terminal of the rectifying bridge and a second terminal coupled to the second terminal of the rectifying bridge, a control switch having a first terminal coupled to the second middle point and a second terminal coupled to the neutral, and an inverter receiving the second and the third DC voltages and outputting a first AC voltage.

Preferably, the circuit further includes a rectifying circuit, an output capacitor having a first and a second terminals and a DC bus having a positive and a negative terminals, wherein each the control switch further includes a control terminal, the rectifying circuit receives a second AC voltage and outputs the first DC voltage, each the inverter has a first input terminal coupled to the positive terminal of the DC bus, a second input terminal coupled to the negative terminal of the DC bus and an output terminal coupled to the first terminal of the output capacitor, and the neutral is coupled to the second terminal of the output capacitor.

Preferably, each the PFC circuit further includes an upper diode, an upper capacitor, a lower diode and a lower capacitor, each the diode has an anode and a cathode, each the capacitor has a first and a second terminals, the anode of the upper diode is coupled to the first terminal of the switch bridge, the cathode of the upper diode is coupled to the first terminal of the upper capacitor and the first input terminal of the inverter, the cathode of the lower diode is coupled to the second terminal of the switch bridge, the anode of the lower diode is coupled to the second terminal of the lower capacitor and the second input terminal of the inverter, and the second terminal of the upper capacitor and the first terminal of the lower capacitor are both coupled to the neutral.

Preferably, each the PFC circuit further includes an upper diode, an upper capacitor, an EMI control switch and a lower capacitor, each the diode has an anode and a cathode, each the capacitor has a first and a second terminals, the EMI control switch has a first, a second and a control terminals, the anode of the upper diode is coupled to the first terminal of the switch bridge, the cathode of the upper diode is coupled to the first terminal of the upper capacitor and the first input terminal of the inverter, the second terminal of the EMI control switch is coupled to the second terminal of the switch bridge, the first terminal of the EMI control switch is coupled to the second terminal of the lower capacitor and the second input terminal of the inverter, and the second terminal of the upper capacitor and the first terminal of the lower capacitor are both coupled to the neutral.

Preferably, each of the upper and the lower switches has a first, a second and a control terminals, the first terminal of the upper switch and the second terminal of the lower switch are both coupled to the second middle point, the second terminal of the upper switch is coupled to the first terminal of the switch bridge, and the first terminal of the lower switch is coupled to the second terminal of the switch bridge.

Preferably, each the diode has an anode and a cathode, the anode of the first bypass diode is coupled to the cathode of the second bypass diode and the first middle point, the cathode of the first bypass diode is coupled to the first terminal of the rectifying bridge, and the anode of the second bypass diode is coupled to the second terminal of the rectifying bridge.

Preferably, the circuit operates under one of a DC mode having a positive and a negative half-cycles and an AC mode having a positive and a negative half-cycles, wherein the control switch is an IGBT having a reverse parallel-connected diode, the control switch is turned on while under the positive half-cycle of one of the DC mode and the positive and the negative half-cycle of AC mode, and the control switch is turned off while under the negative half-cycle of the DC mode where the reverse parallel-connected diode of the control switch is used to prevent a reverse flow of a current of the control switch and to bear a reverse voltage such that all the PFC circuits reach a current balance at this time moment.

According to the third aspect of the present invention, a UPS circuit includes a neutral, a battery having a positive terminal receiving a first DC voltage and a negative terminal, and a first PFC boost converter including a first PFC circuit outputting a second and a third DC voltages, and including a first inductor having a first terminal coupled to the positive terminal and a second terminal, a first rectifying bridge including a first and a second bypass diodes coupled to a first middle point coupled to the second terminal of the first inductor, and having a first terminal and a second terminal coupled to the negative terminal, a first switch bridge including a first upper and a first lower switches coupled to a second middle point, and having a first terminal coupled to the first terminal of the first rectifying bridge and a second terminal coupled to the second terminal of the first rectifying bridge, a first control switch having a first terminal coupled to the second middle point and a second terminal coupled to the neutral, and a first inverter receiving the second and the third DC voltages and outputting a first AC voltage.

Preferably, the circuit further includes a second PFC boost converter, wherein each of the first and the second control switches further includes a control terminal.

The present invention may best be understood through the following descriptions with reference to the accompanying drawings, in which:

DETAILED DESCRIPTION OF THE PREFERRED EMBODIMENT

Figure 1:
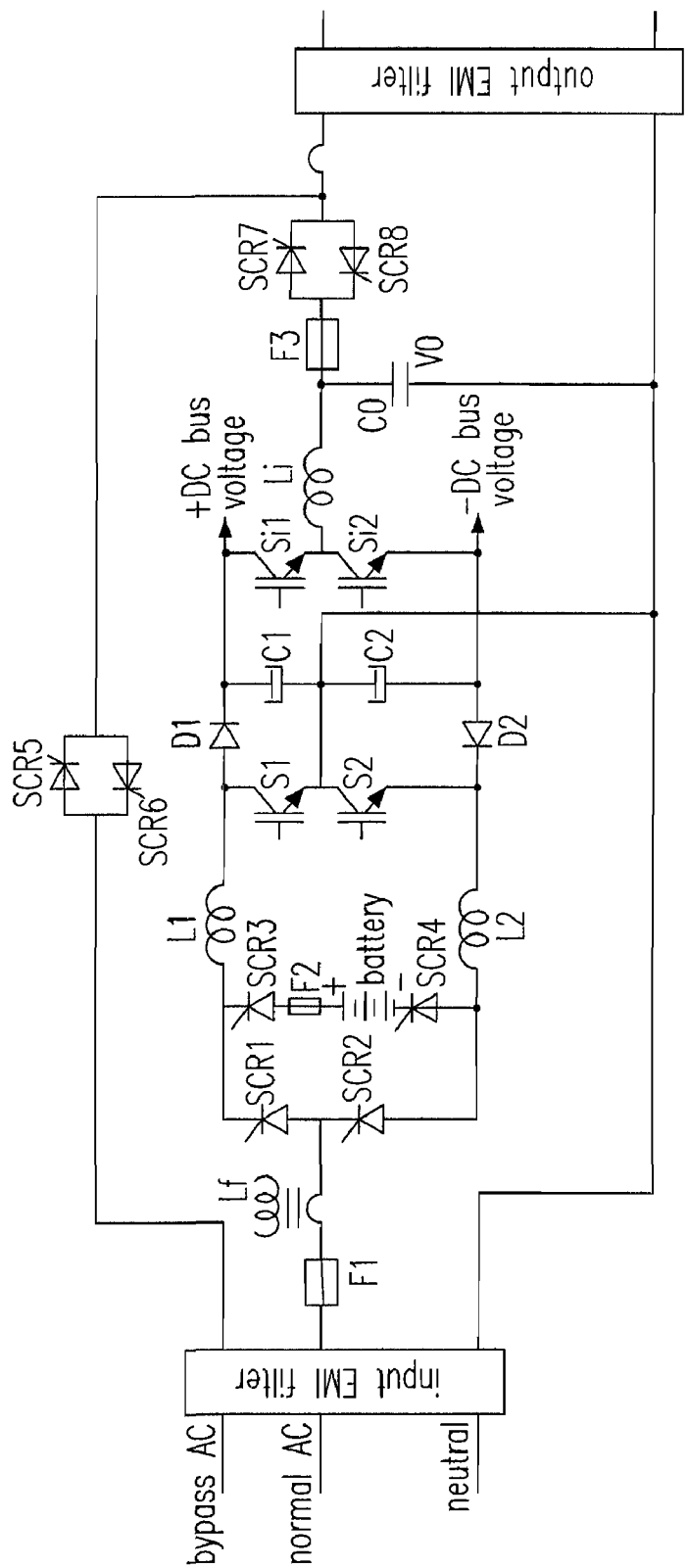
FIG. 1 shows a circuit diagram of an online UPS in the prior art.
Figure 2A:
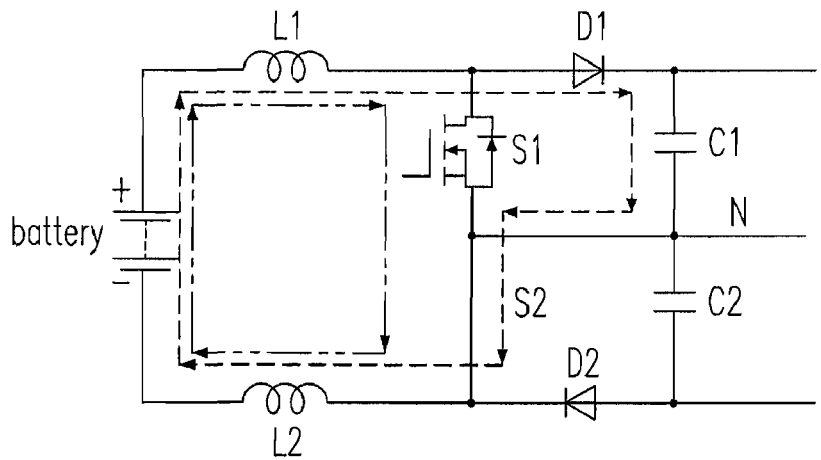
FIG. 2(a) shows current flow directions in the positive half-cycle of the DC mode of the online UPS as shown in FIG. 1.
Figure 2B:
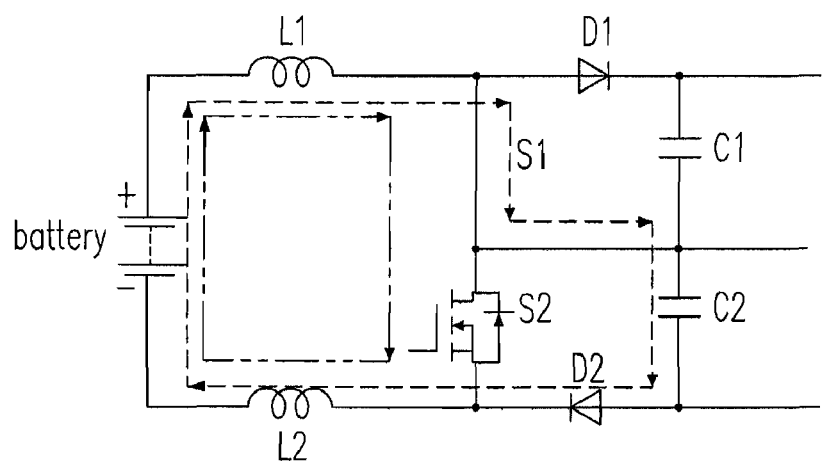
FIG. 2(b) shows current flow directions in the negative half-cycle of the DC mode of the online UPS as shown in FIG. 1.
Figure 2C:
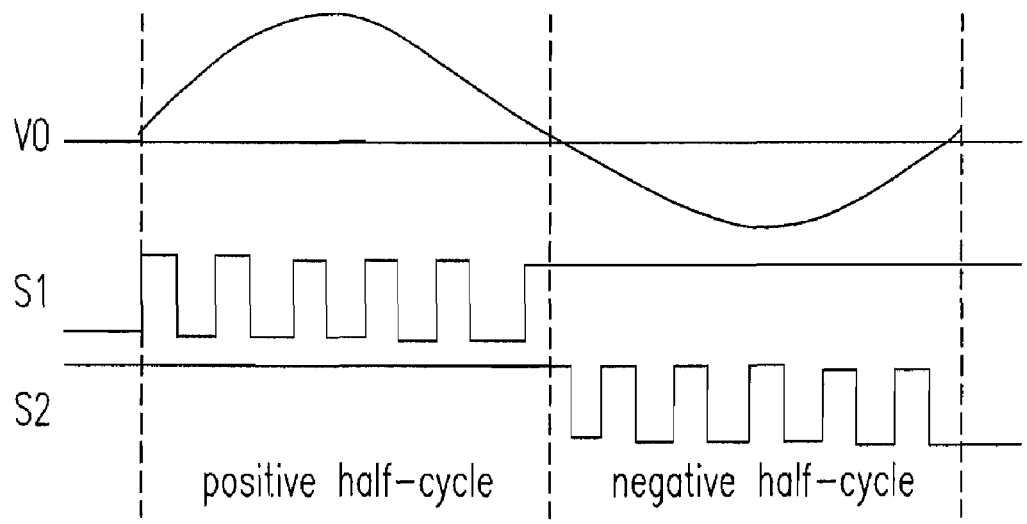
FIG. 2(c) shows waveform diagrams of the output voltage and the driving signals of the upper and the lower switches in the positive and the negative half-cycles of the DC mode of the online UPS as shown in FIG. 1.
Figure 2D:
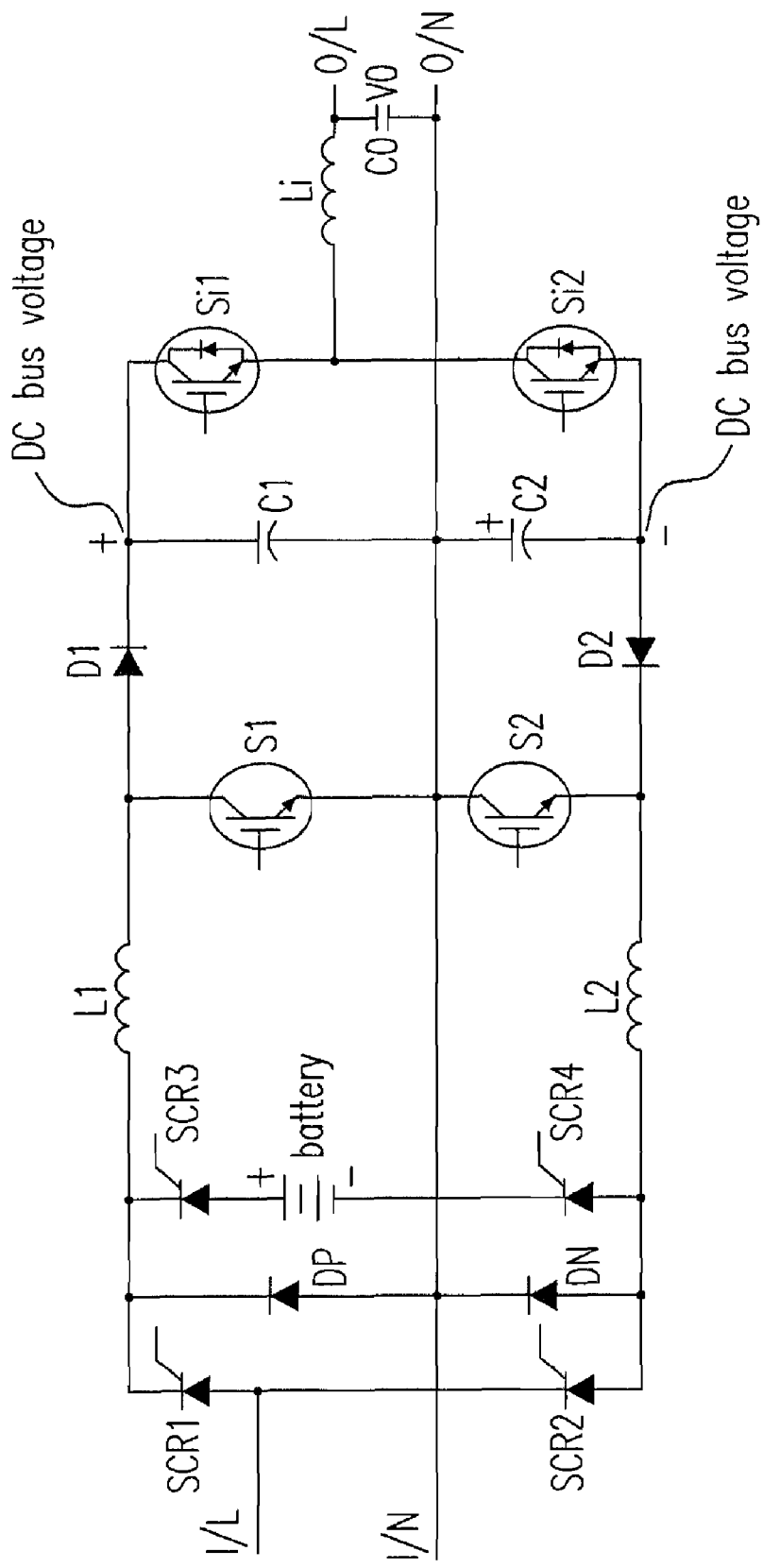
FIG. 2(d) shows a circuit diagram of another online UPS in the prior art
Figure 3:
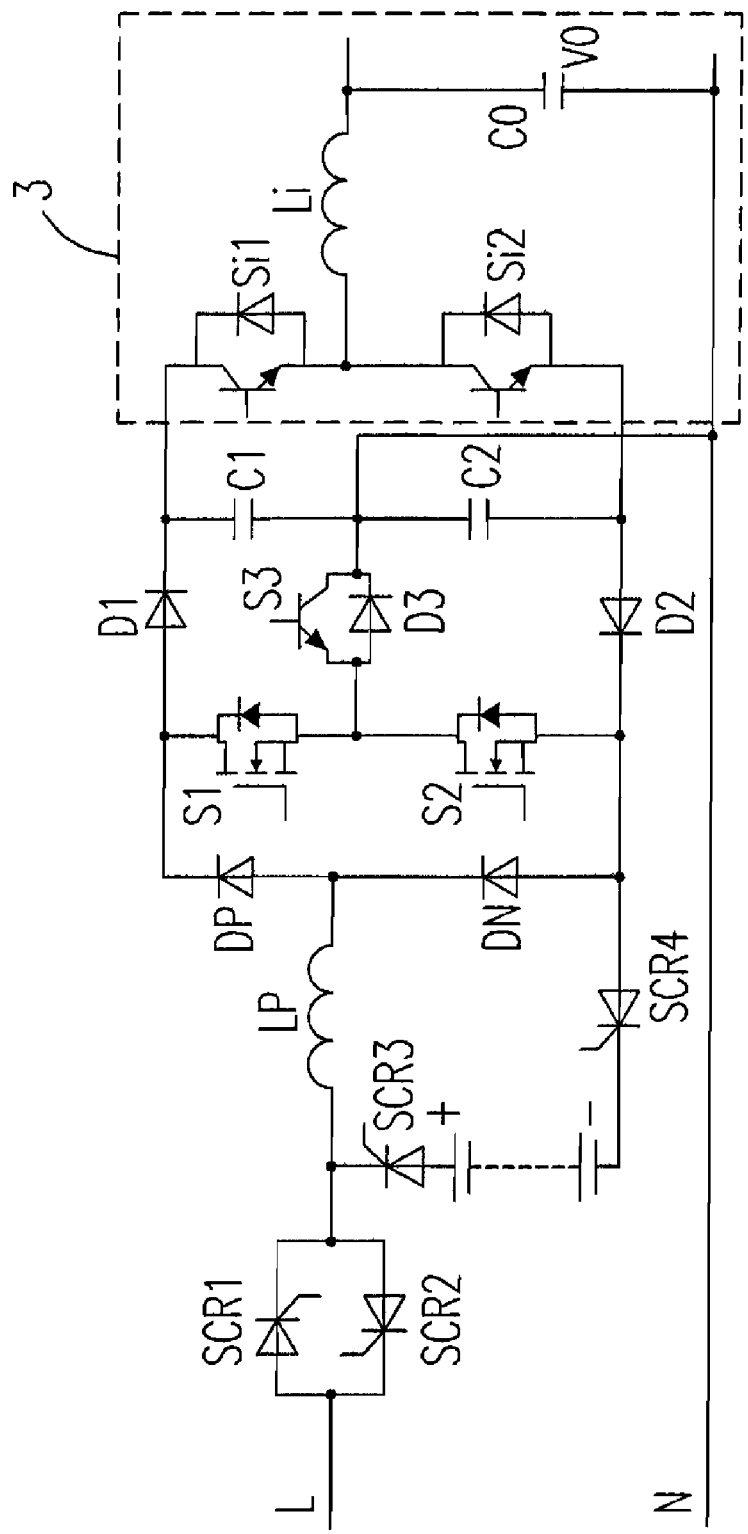
FIG. 3 shows a circuit diagram of an online UPS according to the first preferred embodiment of the present invention.

Please refer to FIG. 3, it shows a circuit diagram of an online UPS according to the first preferred embodiment of the present invention. In FIG. 3, there is only an inductor Lp used for the PFC and connected before the rectifying bridge of DP and DN, and after the battery. In the AC mode, this inductor Lp is used to engage the conversion no matter it is in the positive half-cycle or the negative half-cycle of the input voltage. The UPS enters the DC (battery) mode when the AC is cut off, and the positive terminal of the battery set goes through a SCR SCR3 and connects to the front-end of PFC inductor Lp. In the DC mode, the AC switch is turned off, and the battery set goes through the jointly used PFC circuit to transfer the energy to the positive/negative terminals of the DC bus for providing the power to the inverter 3. The negative terminal of the battery set goes through a SCR SCR4 to be connected to the lower switch S2 of the PFC circuit.

Figure 4:
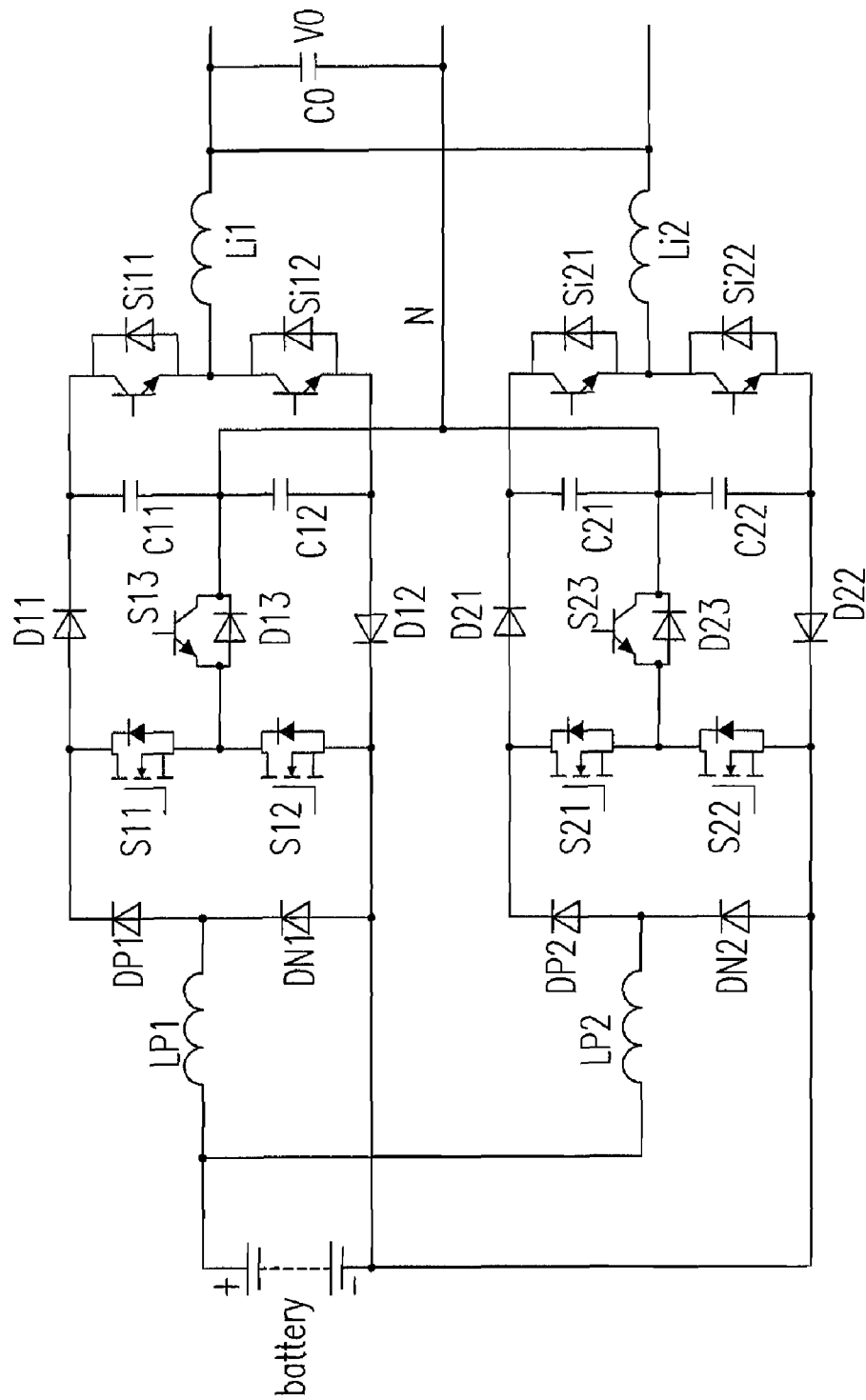
FIG. 4 shows a circuit diagram of an online parallel-connected UPS circuit according to the second preferred embodiment of the present invention.

To realize a parallel operation of multiple UPSs with a jointly used battery set, it is required that no matter the battery set provides the power to the capacitor connected to the positive terminal of the DC bus or the capacitor connected to the negative terminal of the DC bus, each parallel-connected UPS mode could independently control the current it draws from the jointly used battery. That is to say, the input current of each UPS can be controlled independently but not to generate the problems such as current unbalance among power modes and current oscillations due to that the circuit of the jointly used battery is connected. The method employed in the present invention is to add an IGBT having a reverse parallel-connected diode (S3 as shown in FIG. 3) among the neutral and the PFC switches such that there is a controllable decoupling switch S3 between the negative terminal of the battery set and the neutral. The way the present invention works is the same as those of the existing technologies as shown in FIGS. 2(a)-2(d). But due to there is only one inductor Lp and it is located before the rectifying bridge, there exists the circumstances of parallel-connected inductors of two UPS modes only in the negative half-cycle of the DC mode when two UPS modes are parallel-connected according to the second preferred embodiment of the present invention as shown in FIG. 4 (including inductors LPj and Lij, diodes DPj, DNj and Dj1-Dj2, switches Sj1-Sj3 and Sij1-Sij2, capacitors Cj1-Cj2 and Co and a battery set, wherein j=1,2). Please refer to the current path of FIG. 2(b) or the driving signals of the negative half-cycle of FIG. 2(c) for the specific working procedure. During the time period of the negative half-cycle of the DC mode, S1 is continuously turned on, and S2 is a PWM switch. The input inductors LP1 and LP2 of the two UPS modes in FIG. 4 are actually parallel-connected through the neutral N. To solve the current unbalance and out of control problems caused by parallel connection, the most thorough method is to prevent the parallel connection. In FIG. 4, switches S13/S23 and their reverse parallel-connected diodes D13/D23 could realize this function. In which, S13/S23 are continuously turned on in the positive half-cycles of the DC mode and the positive and negative half-cycles of the AC mode, the decoupling switches S13/S23 are turned off in the negative half-cycles of the DC mode wherein the parallel-connected inductors are appeared, the parallel-connected diodes D13/D23 of S13/S23 are used to prevent a reverse flow of the current and bear the withstand voltage such that the two inductors would not be coupled together, and the currents flow through the inductor LP1 and LP2 would only be controlled by switches S12/S22 respectively. The aforementioned problem regarding the current unbalance among power modes brought up by working with the jointly used battery and the parallel-connected inverters in the DC mode is also solved.

Figure 5:
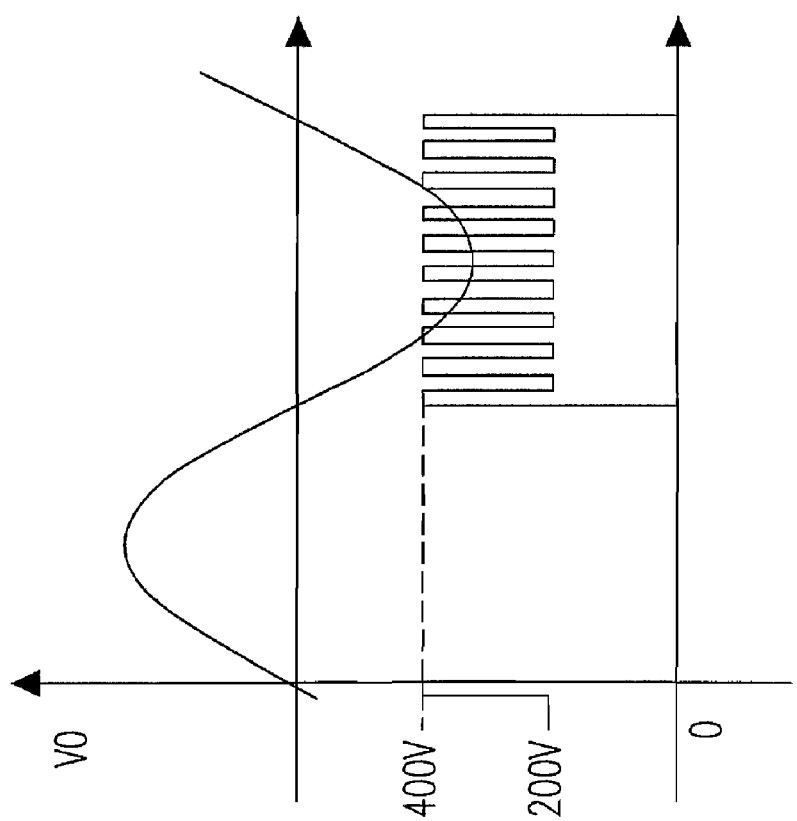
FIG. 5 shows waveform diagrams displaying high-frequency voltage jump EMI when an inductor of the online UPS as shown in FIG. 4 is charging and discharging.
Figure 6:
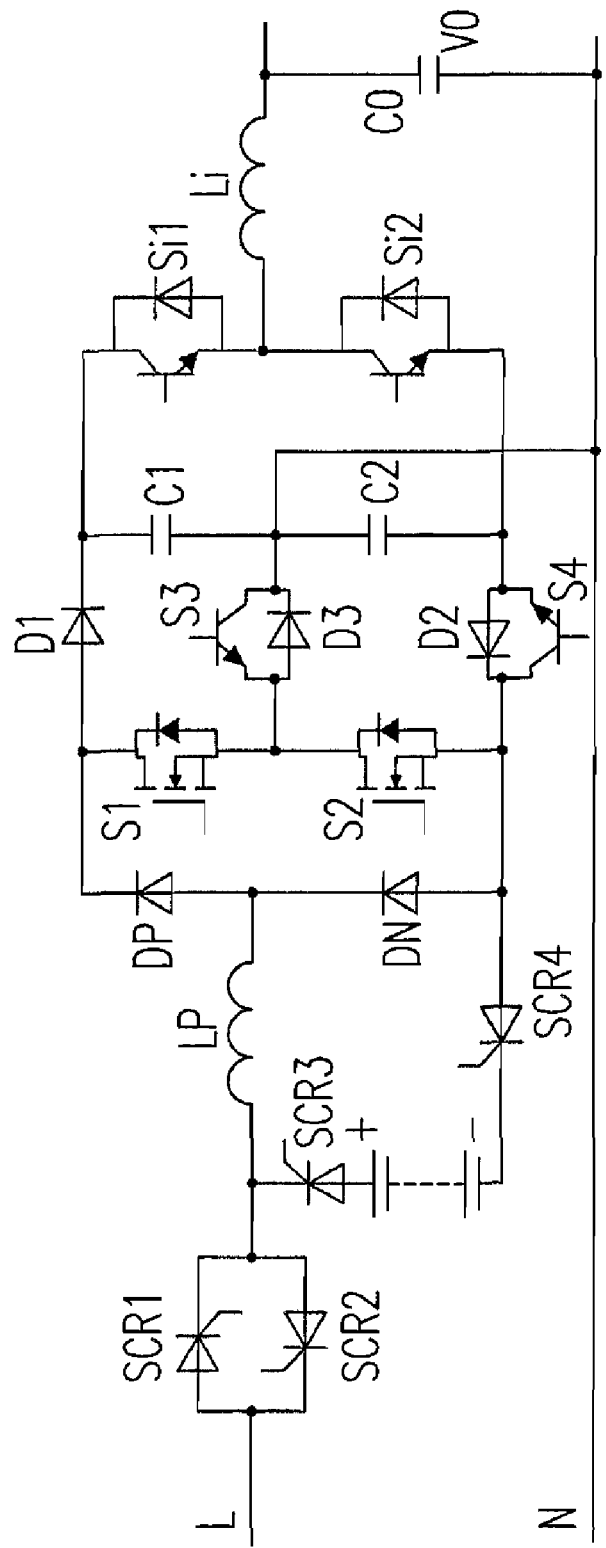
FIG. 6 shows a circuit diagram of an online UPS according to the third preferred embodiment of the present invention.
Figure 7:
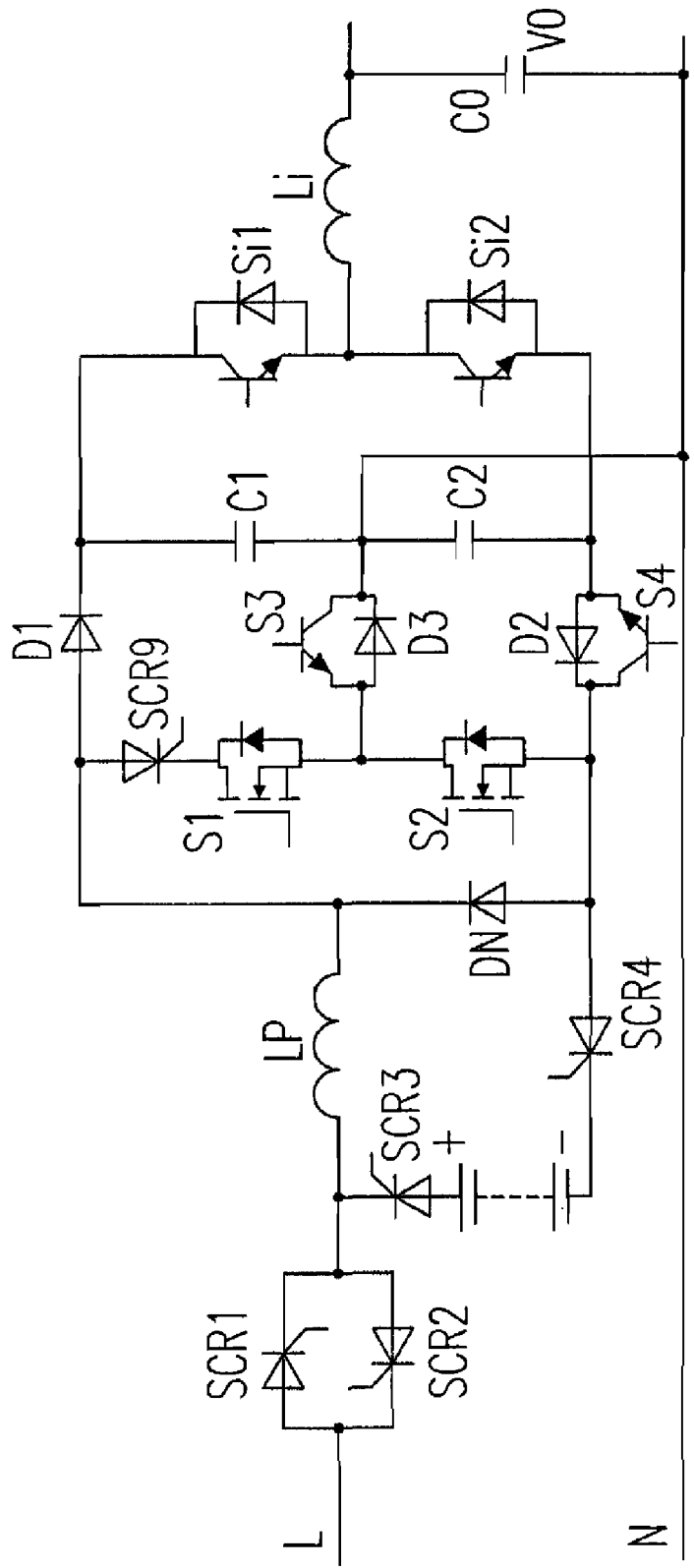
FIG. 7 shows a circuit diagram of an online UPS according to the fourth preferred embodiment of the present invention.

In the circuit according to the third preferred embodiment of the present invention (as shown in FIG. 3), during the inductor charging stage of the negative half-cycle of the DC mode, S1 and S2 are both turned on, current flows through S1, S2 and SCR4 and goes back to the negative terminal of the battery. Since the decoupling switch S3 is turned off at this time, the voltage on C2 (the neutral voltage is 0, the negative bus voltage is usually −400V) will be endured and voltage-divided by two nonconductive diodes D3 and D2. Thus, the voltage at the cathode terminal of D2 is −200V. But during the inductor discharging stage, current flows through the path of D3, C2 and D2, and D2 is conductive, thus the voltage at the cathode terminal of D2 equals to −400V. In this way, an EMI interference source of high frequency voltage jump from −200V to −400V appears as shown in the waveform diagram of the output voltage Vo of the output capacitor Co of FIG. 5. To further improve the effect of the present invention, a circuit diagram of an online UPS according to the third preferred embodiment of the present invention is shown in FIG. 6. In which, a switch S4 is parallel-connected to the originally configured diode D2, and S4 is turned on only in the negative half-cycle of the DC mode, thus to keep the voltage at the cathode terminal of D2 at −400V no matter it is in the aforementioned inductor charging stage or the inductor discharging stage. Due to that D1 is a diode which could bear a high voltage of 800V as shown in FIG. 6, thus in the circuit according to the fourth preferred embodiment of the present invention as shown in FIG. 7, the anode of D1 is directly connected to the PFC inductor LP, a SCR SCR9 is used to replace DP at the same time, the anode of SCR9 is coupled to the anode of D1, and the cathode of SCR9 is coupled to the drain of S1. In this way, the conduction loss of SCR9 is decreased, and the various working statuses of the circuit are not influenced.

In the present invention, through the reduction of an inductor, the utilization rate of the inductor is raised, and the price of an inductor is far higher than that of the increased control (decoupling) switch S3, thus the cost is also lowered by the present invention. Through the adding of a decoupling switch S3 in the present invention, a battery set could be jointly used by multiple UPS modes and there is nothing to worry about the current balance problem, and the EMI problem is solved by adding a switch S4. Finally, certain conduction losses of SCR9 are saved through connecting the anode of D1 to the PFC inductor LP and using a SCR SCR9 to replace DP. The present invention accomplishes the original functions on the basis of cost reduction, and the parallel connection of multiple UPS modes is realized.

According to the aforementioned descriptions, the present invention provides a parallel-connected UPS circuit, and this circuit realizes the multiple UPS modes parallel-connected to a battery set, causes all the UPS modes to reach a current balance and reduces the usage of magnetic elements while comparing to the conventional configuration thus to dramatically decrease the volume of the UPS power mode, greatly diminish the EMI, relatively decrease the manufacturing costs and the total costs of the parallel-connected UPS circuit at the same time due to that an inductor is decreased and a switch is increased in each of the UPS modes.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. An uninterrupted power supply (UPS) circuit, comprising:
    a neutral;
    a battery having a positive terminal receiving a first DC voltage and a negative terminal;
    a first PFC boost converter, comprising:
        a first PFC circuit outputting a second and a third DC voltages, and comprising:
            a first inductor having a first terminal coupled to the positive terminal and a second terminal;
            a first rectifying bridge comprising a first and a second bypass diodes coupled to a first middle point coupled to the second terminal of the first inductor, and having a first terminal, and a second terminal coupled to the negative terminal;
            a first switch bridge comprising a first upper and a first lower switches coupled to a second middle point, and having a first terminal coupled to the first terminal of the first rectifying bridge and a second terminal coupled to the second terminal of the first rectifying bridge;
            a first control switch having a first terminal coupled to the second middle point and a second terminal coupled to the neutral; and
        a first inverter receiving the second and the third DC voltages and outputting a first AC voltage; and
    a second PFC boost converter, comprising:
        a second PFC circuit outputting the second and the third DC voltages, and comprising:
            a second inductor having a first terminal coupled to the positive terminal and a second terminal;
            a second rectifying bridge comprising a third and a fourth bypass diodes coupled to a third middle point coupled to the second terminal of the second inductor, and having a first terminal and a second terminal coupled to the negative terminal;
            a second switch bridge comprising a second upper and a second lower switches coupled to a fourth middle point, and having a first terminal coupled to the first terminal of the second rectifying bridge and a second terminal coupled to the second terminal of the second rectifying bridge;
            a second control switch having a first terminal coupled to the fourth middle point and a second terminal coupled to the neutral, wherein the UPS circuit operates under one of a DC mode having a positive and a negative half-cycles, and an AC mode having a positive and a negative half-cycles, the first and the second control switches are turned on while under one of the positive half-cycle of the DC mode and the AC mode, and the first and the second control switches are turned off while under the negative half-cycle of the DC mode; and
        a second inverter receiving the second and the third DC voltages and outputting the first AC voltage.

2. A circuit according to claim 1 further comprising a rectifying circuit, an output capacitor having a first and a second terminals and a DC bus having a positive and a negative terminals, wherein each of the first and the second control switches further comprises a control terminal, the rectifying circuit receives a second AC voltage and outputs the first DC voltage, each of the first and the second inverters has a first input terminal coupled to the positive terminal of the DC bus, a second input terminal coupled to the negative terminal of the DC bus and an output terminal coupled to the first terminal of the output capacitor, and the neutral is coupled to the second terminal of the output capacitor.

3. A circuit according to claim 2, wherein the first PFC circuit further comprises a first upper diode, a first upper capacitor, a first lower diode and a first lower capacitor, the second PFC circuit further comprises a second upper diode, a second upper capacitor, a second lower diode and a second lower capacitor, each the diode has an anode and a cathode, and each the capacitor has a first and a second terminals.

4. A circuit according to claim 3, wherein the anode of the first upper diode is coupled to the first terminal of the first switch bridge, the cathode of the first upper diode is coupled to the first terminal of the first upper capacitor and the first input terminal of the first inverter, the cathode of the first lower diode is coupled to the second terminal of the first switch bridge, the anode of the first lower diode is coupled to the second terminal of the first lower capacitor and the second input terminal of the first inverter, and the second terminal of the first upper capacitor and the first terminal of the first lower capacitor are both coupled to the neutral, the anode of the second upper diode is coupled to the first terminal of the second switch bridge, the cathode of the second upper diode is coupled to the first terminal of the second upper capacitor and the first input terminal of the second inverter, the cathode of the second lower diode is coupled to the second terminal of the second switch bridge, the anode of the second lower diode is coupled to the second terminal of the second lower capacitor and the second input terminal of the second inverter, and the second terminal of the second upper capacitor and the first terminal of the second lower capacitor are both coupled to the neutral.

5. A circuit according to claim 3, wherein the anode of the first upper diode is coupled to the second terminal of the first inductor, the first bypass diode is a first SCR, the anode of the first SCR is coupled to the anode of the first upper diode, the cathode of the first SCR is coupled to the drain of the first upper switch, the anode of the second upper diode is coupled to the second terminal of the second inductor, the third bypass diode is a second SCR, the anode of the second SCR is coupled to the anode of the second upper diode, and the cathode of the second SCR is coupled to the drain of the second upper switch.

6. A circuit according to claim 2, wherein the first PFC circuit further comprises a first upper diode, a first upper capacitor, a third control switch and a first lower capacitor, the second PFC circuit further comprises a second upper diode, a second upper capacitor, a fourth control switch and a second lower capacitor, each the diode has an anode and a cathode, each the capacitor has a first and a second terminals, and each of the third and the fourth control switches has a first, a second and a control terminals.

7. A circuit according to claim 6, wherein the anode of the first upper diode is coupled to the first terminal of the first switch bridge, the cathode of the first upper diode is coupled to the first terminal of the first upper capacitor and the first input terminal of the first inverter, the second terminal of the third control switch is coupled to the second terminal of the first switch bridge, the first terminal of the third control switch is coupled to the second terminal of the first lower capacitor and the second input terminal of the first inverter, the second terminal of the first upper capacitor and the first terminal of the first lower capacitor are both coupled to the neutral the anode of the second upper diode is coupled to the first terminal of the second switch bridge, the cathode of the second upper diode is coupled to the first terminal of the second upper capacitor and the first input terminal of the second inverter, the second terminal of the fourth control switch is coupled to the second terminal of the second switch bridge, the first terminal of the fourth control switch is coupled to the second terminal of the second lower capacitor and the second input terminal of the second inverter, and the second terminal of the second upper capacitor and the first terminal of the second lower capacitor are both coupled to the neutral.

8. A circuit according to claim 6, wherein the third control switch is an IGBT having a reverse parallel-connected diode and the fourth control switch is an IGBT having a reverse parallel-connected diode.

9. A circuit according to claim 1, wherein each of the first upper and the first lower switches has a first, a second and a control terminals, the first terminal of the first upper switch and the second terminal of the first lower switch are both coupled to the second middle point, the second terminal of the first upper switch is coupled to the first terminal of the first switch bridge, and the first terminal of the first lower switch is coupled to the second terminal of the first switch bridge.

10. A circuit according to claim 1, wherein each of the second upper and the second lower switches has a first, a second and a control terminals, the first terminal of the second upper switch and the second terminal of the second lower switch are both coupled to the fourth middle point, the second terminal of the second upper switch is coupled to the first terminal of the second switch bridge, and the first terminal of the second lower switch is coupled to the second terminal of the second switch bridge.

11. A circuit according to claim 1, wherein each the diode has an anode and a cathode, the anode of the first bypass diode is coupled to the cathode of the second bypass diode and the first middle point, the cathode of the first bypass diode is coupled to the first terminal of the first rectifying bridge, and the anode of the second bypass diode is coupled to the second terminal of the first rectifying bridge.

12. A circuit according to claim 1, wherein each the diode has an anode and a cathode, the anode of the third bypass diode is coupled to the cathode of the fourth bypass diode and the third middle point, the cathode of the third bypass diode is coupled to the first terminal of the second rectifying bridge, and the anode of the fourth bypass diode is coupled to the second terminal of the second rectifying bridge.

13. A circuit according to claim 1, wherein each of the first and the second control switches is an IGBT having a reverse parallel-connected diode, where the reverse parallel-connected diodes of the first and the second control switches are respectively used to prevent reverse flows of a first current of the first control switch and a second current of the second control switch and to bear a first reverse and a second reverse voltages such that the first and the second PFC circuits reach a current balance at this time moment.

14. An uninterrupted power supply (UPS) circuit, comprising:
a neutral;
a battery having a positive terminal receiving a first DC voltage and a negative terminal; and
a plurality of PFC boost converters, each of which comprises a PFC circuit outputting a second and a third DC voltages, comprising:
an inductor having a first terminal coupled to the positive terminal and a second terminal;
a rectifying bridge comprising a first and a second bypass diodes coupled to a first middle point coupled to the second terminal of the inductor, and having a first terminal, and a second terminal coupled to the negative terminal;
a switch bridge comprising a first upper and a first lower switches coupled to a second middle point, and having a first terminal coupled to the first terminal of the rectifying bridge and a second terminal coupled to the second terminal of the rectifying bridge;
a control switch having a first terminal coupled to the second middle point and a second terminal coupled to the neutral, wherein the UPS circuit operates under one of a DC mode having a positive and a negative half-cycles, and an AC mode having a positive and a negative half-cycles, each the control switch is turned on while under one of the positive half-cycle of the DC mode and the AC mode, and each the control switch is turned off while under the negative half-cycle of the DC mode; and an inverter receiving the second and the third DC voltages and outputting a first AC voltage.

15. A circuit according to claim 14 further comprising a rectifying circuit, an output capacitor having a first and a second terminals and a DC bus having a positive and a negative terminals, wherein each the control switch further comprises a control terminal, the rectifying circuit receives a second AC voltage and outputs the first DC voltage, each the inverter has a first input terminal coupled to the positive terminal of the DC bus, a second input terminal coupled to the negative terminal of the DC bus and an output terminal coupled to the first terminal of the output capacitor, and the neutral is coupled to the second terminal of the output capacitor.

16. A circuit according to claim 15, wherein each the PFC circuit further comprises an upper diode, an upper capacitor, a lower diode and a lower capacitor, each the diode has an anode and a cathode, each the capacitor has a first and a second terminals, the anode of the upper diode is coupled to the first terminal of the switch bridge, the cathode of the upper diode is coupled to the first terminal of the upper capacitor and the first input terminal of the inverter, the cathode of the lower diode is coupled to the second terminal of the switch bridge, the anode of the lower diode is coupled to the second terminal of the lower capacitor and the second input terminal of the inverter, and the second terminal of the upper capacitor and the first terminal of the lower capacitor are both coupled to the neutral.

17. A circuit according to claim 15, wherein each the PFC circuit further comprises an upper diode, an upper capacitor, an EMI control switch and a lower capacitor, each the diode has an anode and a cathode, each the capacitor has a first and a second terminals, the EMI control switch has a first, a second and a control terminals, the anode of the upper diode is coupled to the first terminal of the switch bridge, the cathode of the upper diode is coupled to the first terminal of the upper capacitor and the first input terminal of the inverter, the second terminal of the EMI control switch is coupled to the second terminal of the switch bridge, the first terminal of the EMI control switch is coupled to the second terminal of the lower capacitor and the second input terminal of the inverter, and the second terminal of the upper capacitor and the first terminal of the lower capacitor are both coupled to the neutral.

18. A circuit according to claim 14, wherein each of the upper and the lower switches has a first, a second and a control terminals, the first terminal of the upper switch and the second terminal of the lower switch are both coupled to the second middle point, the second terminal of the upper switch is coupled to the first terminal of the switch bridge, and the first terminal of the lower switch is coupled to the second terminal of the switch bridge.

19. A circuit according to claim 14, wherein each the diode has an anode and a cathode, the anode of the first bypass diode is coupled to the cathode of the second bypass diode and the first middle point, the cathode of the first bypass diode is coupled to the first terminal of the rectifying bridge, and the anode of the second bypass diode is coupled to the second terminal of the rectifying bridge.

20. A circuit according to claim 14 operating under one of a DC mode having a positive and a negative half-cycles and an AC mode having a positive and a negative half-cycles, wherein the control switch is an IGBT having a reverse parallel-connected diode, the control switch is turned on while under the positive half-cycle of one of the DC mode and the positive and the negative half-cycle of the AC mode, and the control switch is turned off while under the negative half-cycle of the DC mode where the reverse parallel-connected diode of the control switch is used to prevent a reverse flow of a current of the control switch and to bear a reverse voltage such that all the PFC circuits reach a current balance at this time moment.

21. An uninterrupted power supply (UPS) circuit, comprising:
a neutral;
a battery having a positive terminal receiving a first DC voltage and a negative terminal; and
a first PFC boost converter, comprising:
a first PFC circuit outputting a second and a third DC voltages, and comprising:
a first inductor having a first terminal coupled to the positive terminal and a second terminal;
a first rectifying bridge comprising a first and a second bypass diodes coupled to a first middle point coupled to the second terminal of the first inductor, and having a first terminal, and a second terminal coupled to the negative terminal;
a first switch bridge comprising a first upper and a first lower switches coupled to a second middle point, and having a first terminal coupled to the first terminal of the first rectifying bridge and a second terminal coupled to the second terminal of the first rectifying bridge;
a first control switch having a first terminal coupled to the second middle point and a second terminal coupled to the neutral, wherein the UPS circuit operates under one of a DC mode having a positive and a negative half-cycles, and an AC mode having a positive and a negative half-cycles, the first control switch is turned on while under one of the positive half-cycle of the DC mode and the AC mode, and the first control switch is turned off while under the negative half-cycle of the DC mode; and
a first inverter receiving the second and the third DC voltages and outputting a first AC voltage.

22. An uninterrupted power supply (UPS) circuit, comprising:
a neutral;
a battery having a positive terminal receiving a first DC voltage and a negative terminal; and
a first PFC boost converter, comprising:
a first PFC circuit outputting a second and a third DC voltages, and comprising:
a first inductor having a first terminal coupled to the positive terminal and a second terminal;
a first rectifying bridge comprising a first and a second bypass diodes coupled to a first middle point coupled to the second terminal of the first inductor, and having a first terminal, and a second terminal coupled to the negative terminal;
a first switch bridge comprising a first upper and a first lower switches coupled to a second middle point, and having a first terminal coupled to the first terminal of the first rectifying bridge and a second terminal coupled to the second terminal of the first rectifying bridge;

a first control switch having a first terminal coupled to the second middle point and a second terminal coupled to the neutral; and a first inverter receiving the second and the third DC voltages and outputting a first AC voltage, further comprising a second PFC boost converter, wherein the second PFC boost converter is a second PFC boost converter as claimed in claim 1, and each of the first and the second control switches further comprises a control terminal, wherein the UPS circuit operates under one of a DC mode having a positive and a negative half-cycles, and an AC mode having a positive and a negative half-cycles, the first and the second control switches are turned on while under one of the positive half-cycle of the DC mode and the AC mode, and the first and the second control switches are turned off while under the negative half-cycle of the DC mode.

* * * * *